Dec. 14, 1965     C. L. ASHBROOK ETAL     3,223,112
AUTOMATIC CONTROL SYSTEM FOR A PISTON OPERATED VALVE
Filed April 26, 1960
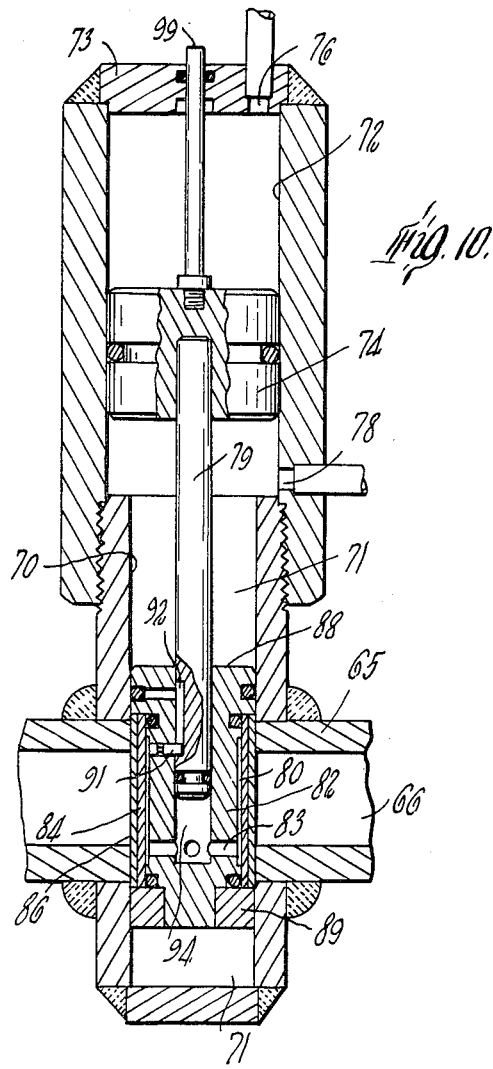
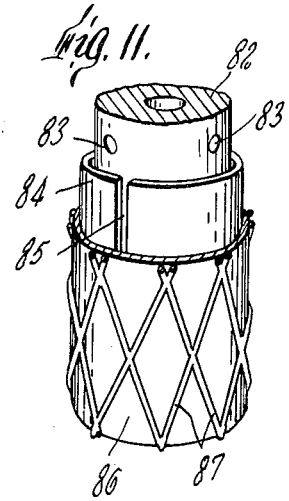
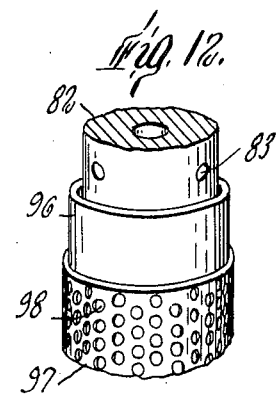

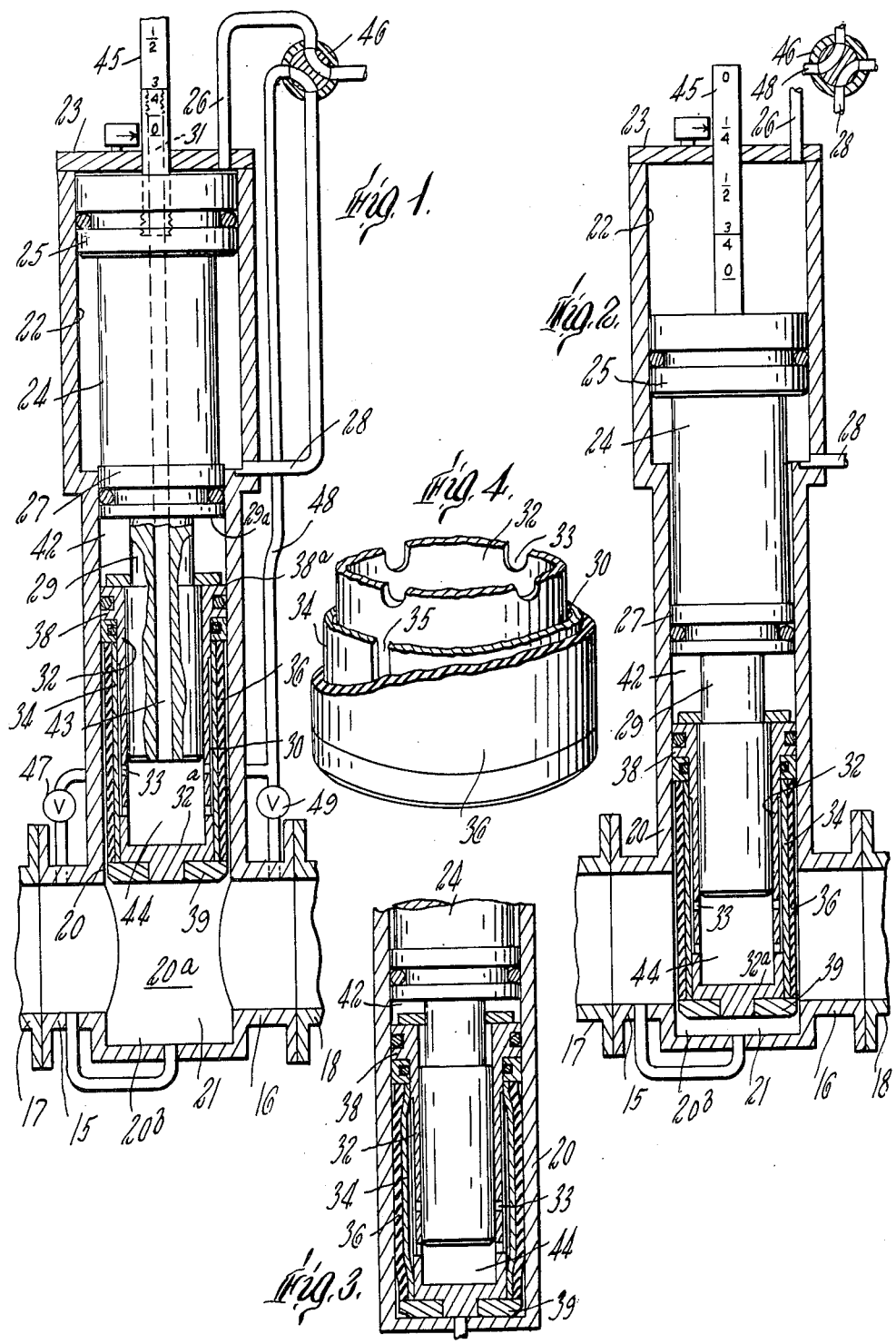

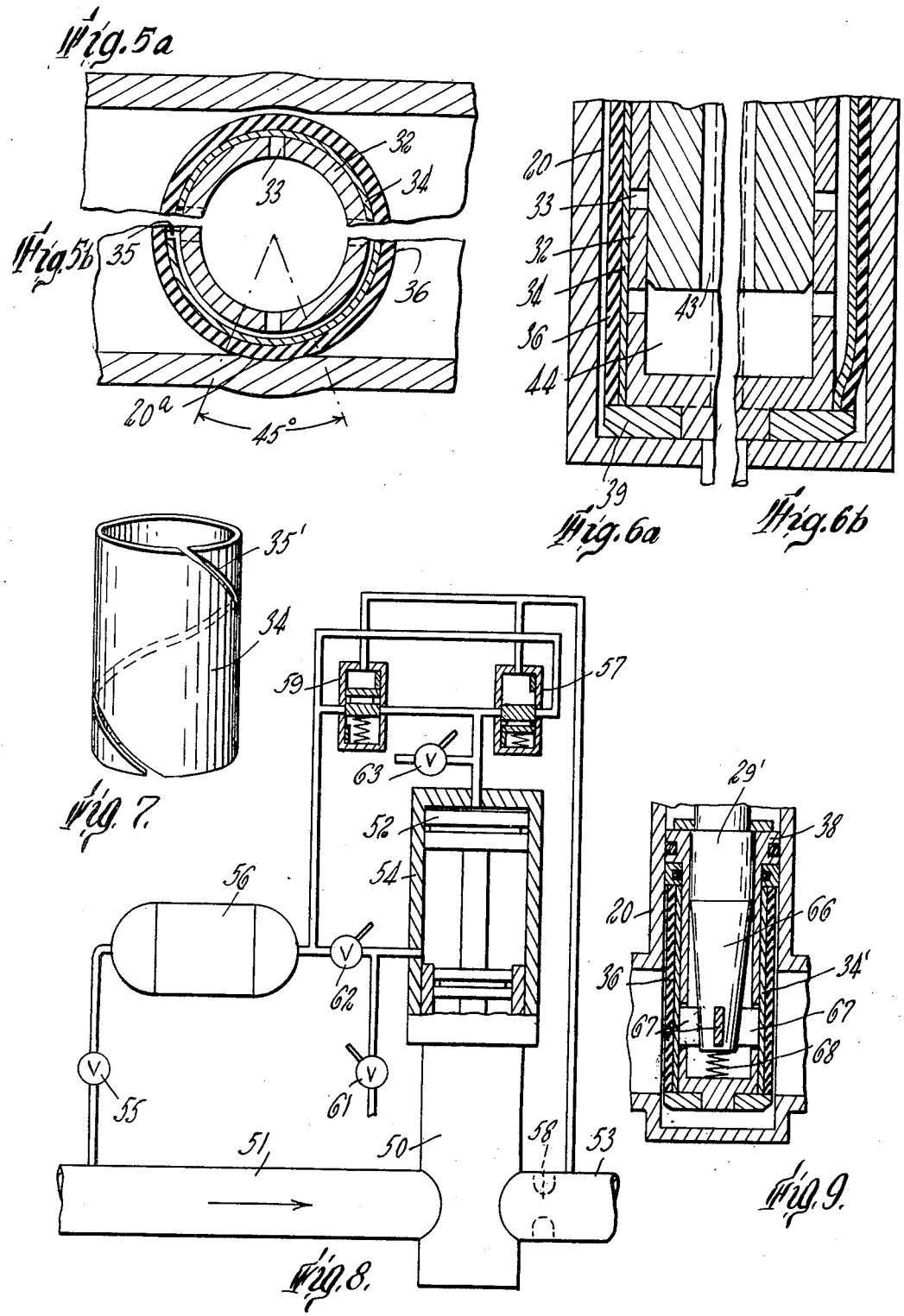

United States Patent Office 3,223,112
Patented Dec. 14, 1965

3,223,112
AUTOMATIC CONTROL SYSTEM FOR A
PISTON OPERATED VALVE
Clifford L. Ashbrook, 5027 Cheena St., and Wilson G.
Wing, 33 E. Rivercrest Drive, both of Houston, Tex.
Filed Apr. 26, 1960, Ser. No. 24,787
2 Claims. (Cl. 137—458)

This application is a continuation-in-part of our application Serial No. 846,443, filed October 14, 1959, and now Patent No. 3,115,329.

This invention relates to fluid valves and more particularly to a novel expansible piston valve.

In gas transmission systems, such as are used to transport natural gas to a local distribution point from distant well sites, the pipelines are of relatively large size, say from 4 inches to 30 inches. With such large pipelines, as well as for other reasons arising from the unique characteristics of this particular service, the provision of suitable valves, both for normal operating and emergency use, has heretofore not been solved to the degree desired. For example, it has long been considered important to provide a practical non-lubricated valve. This is not only because of the difficulty of providing adequate lubrication for reliable valve operation, even when the valve may not have been operated for a long period of time, as in emergency service, but also to avoid contamination of the gas by lubrication oil as is especially important in metering systems, as well as to provide a valve which will operate in extremes of temperature without either seizing or excess leakage either because of lubrication failure or valve element heat expansion. Furthermore, the provision of power to operate the valve has been a problem, for example with large valves in remote locations which must be operated rapidly to shut off in case of a pipeline break. A large valve of the heretofore known types cannot be operated by hand at a sufficiently high speed for such service, so that some form of power operation preferably without human intervention must be provided, which in itself raises a reliability problem. Even with power operation, speed of closing remains a problem especially in emergencies. Again, with cross-country pipelines, pipeline cleaning is a problem and, ideally, a valve should permit the unobstructed travel of a pipeline cleaning device throughout the length of the pipeline. Finally, because of the large numbers of valves used in these systems, cost is a problem, yet reliability cannot be sacrificed.

Accordingly, it is an object of the present invention to provide a valve structure which meets all of the above enumerated problems and solves them in a highly satisfactory manner. This has been accomplished by providing a novel valve having a cylindrical, expansible sliding piston element movable from an open position clear of the full pipeline diameter straight passage through the valve to a closed position blocking said passage and expanded into contact with the side walls thereof. Since the piston element operates in a cylindrical bore of a diameter at least as great and preferably somewhat greater than that of the passage, but at right angles thereto, and is provided with a substantial clearance, it slides readily to and from closed position, but in that position is expanded to press it into sealing contact with the side wall of the passage for a substantial peripheral extent. Thus, no lubrication is needed for rapid valve travel and an open passage is provided for the travel of pipeline clearing devices therethrough. Furthermore, because of the provision of the novel expansible element of the valve of the invention, operating clearances are not a problem, so that operation in extreme temperature conditions is possible.

It is another object of the invention to provide a valve structure which may readily be operated by gas pressures available in the pipeline, either to close it or open it, so that manual operation is not necessary. This makes possible a great increase in reliability of heretofore known structures and so makes possible the use of remotely operated valves of large size even in areas diffcult of access. To accomplish this result a novel differential piston operator is provided for the valve of the invention, as well as automatically operable means for expanding the valve piston when it is in closed position. The differential piston operator and piston expansion operator may be operated by pilot valve means which may itself be operated either manually, or by a radio or wire link in remote service.

It is still another object of the present invention to provide an automatic control system in conjunction with the valve of the invention whereby a loss in pipeline pressure or a dangerous increase in pipeline pressure will automatically cause the valve to close and remain closed until the proper pressure can be restored. This is most useful for emergency service.

Other objects of the invention are the provision of a simple yet highly reliable valve.

It is a still further object of the invention to provide a valve structure having an expansible piston which remains positioned in the valve passageway even in open position, the expansion and contraction of the expansible piston itself serving to close and open an annular area around the piston within the passage for fluid flow therearound. It is a particular feature of such a valve that sealing problems inherent in a movable piston are virtually eliminated, yet the unique passageway sealing provided by sealing around a substantial portion of the periphery of the piston is particularly effective making such valve especially useful at pressures of several thousand p.s.i. By a suitable configuration of the sealing surfaces of the expansible piston and the cooperating wall, a multistage sealing effect may be achieved.

Further objects and feautres of the invention will be apparent from the following detailed descriptions of preferred embodiments thereof, together with the accompanying drawings, wherein:

FIG. 1 is a sectional view of a preferred embodiment of the valve of the invention in open condition;

FIG. 2 is a sectional view similar to that of FIG. 1 but with the valve partially closed;

FIG. 3 is a partial sectional view similar to that of FIG. 1 with the valve fully closed;

FIG. 4 is an isometric detail view of a portion of the piston element of the valve of FIG. 1, partially broken away better to show its construction;

FIGS. 5a and 6a are respectively enlarged cross sectional plan and side views of a portion of the valve of FIG. 1 showing the piston thereof in closed position in nonexpanded condition;

FIGS. 5b and 6b are respectively enlarged cross sectional plan and side views of a portion of the valve of FIG. 1 showing the piston thereof in closed position in expanded to seal condition;

FIG. 7 is an isometric view of a portion of the piston element somewhat modified from that of FIG. 4;

FIG. 8 is a diagrammatic view of a preferred embodiment of the novel control system of the invention as used with the valve of FIG. 1;

FIG. 9 is a partial sectional view of a modification of the valve of FIG. 1 showing a mechanical actuating means therefor;

FIG. 10 is a sectional view of another preferred embodiment of the valve of the invention shown in closed condition;

FIG. 11 is an isometric detail view of a portion of the piston element of the valve of FIG. 9, partially broken away better to show its construction;

FIG. 12 is an isometric detail view of a portion of a piston element somewhat modified from that of FIG. 11, partially broken away better to show its construction.

In FIGS. 1-6 there is shown a valve according to the present invention which incorporates a differential area piston and a confined pressure fluid to operate the valve. By means of this arrangement, the valve may be operated by gas pressure from the pipeline by the inter-position of a suitable manually or remotely operated valve or an automatic control as is hereinafter more fully explained. As will be seen from the figures, the valve has a housing or body 15 having a uniform cylindrical bore 16 whose wall defines a flow passage between pipelines 17, 18. In communication with the flow passage is a lower cylindrical main chamber having a diameter at least as great and preferably somewhat greater than the cylindrical bore, the wall of which has been designated 20. Opposite to the main chamber there is formed a shallow well 21 in the nature of a continuation of the main chamber, the common axis of said chambers extending perpendicular to the axis of the bore. It should be noted that the portion 20a of wall 20 within the flow passage has a substantial peripheral extent of at least a few degrees and preferably about 45 degrees as shown (FIG. 5b) for optimum sealing when closed, since the effective sealing takes place throughout such area and around the periphery of the chambers immediately above and below it, as is hereinafter described in more detail.

Referring now to the structure of the valve of FIGS. 1-6 in more detail, to provide a differential area for operation by pipeline pressure, the upper portion of the main chamber consists of a cylinder defined by wall 22 of larger diameter than that of cylinder 20 below. It has an end closure 23. The differential area piston assembly 24 is disposed in sliding engagement within the main chamber, in which the cylinder 20 thereof adjacent to the flow passage is of lesser diameter than the cylinder 22 above. Likewise, the piston assembly has two axially spaced portions 25 and 27 of correspondingly unequal diameter on which are mounted suitable piston rings. As shown, a substantially smaller axial portion 29 of assembly 24 extends beyond the portion 27.

To control the position of the assembly 24, a selected side of the piston portion 25 is pressurized with fluid from the up-stream side of the valve, by means of line 48 and selector valves 47 and 49 and the opposite side is opened to exhaust by means of a selector valve 46. A radial passage 28 in the wall of cylinder 22 is provided for this purpose together with a longitudinal passage 26 in end closure 23. Closure 23 is also bored to provide a clearance for a gage element 45 which is rigidly attached to piston portion 25.

Disposed concentrically about and in sliding engagement with the outside wall of piston portion 29 is the expansible element assembly which is adapted selectively to be moved in and out of the way of the flow passage. This assembly has a closed end tubular element 32 which has radial passages 33 communicating with the inner surface of the surrounding composite longitudinally rigid, radially expansible sleeve element. Such element consists of an inner radially expansible metallic element 34 having an axial slot 35 therein (FIG. 4) or a helical slot 35' therein (FIG. 7) and a surrounding outer element 36 of a rubberlike material preferably bonded to the inner element. The outer element has an unbroken surface for sealing, it bridging the slot 35, and is desirably of natural or more preferably synthetic rubber or suitable plastic with a hardness of about 40-90 durometer.

A metallic ring 38, formed as a part of the inner end of element 32, prevents upward movement of the composite sleeve element relatively thereto and a rigid metallic ring 39 mounted on the outer closed end of element 32 prevents movement in the other direction. Ring 38 is disposed in sliding engagement both with the piston portion 29 and wall 20 therebetween and may be provided with piston rings. The ends of the sleeve element are sealed to said rings, and between the inner element 34 and the lower portion of element 32 is preferably left a small annular chamber 30, communication thereinto being provided by passages 33.

As shown, then, the expansible element has an upper inexpansible rigid longitudinal portion in contact with the wall 20, an intermediate expansible portion and a lower inexpansible rigid portion which is in contact with the wall 20b in recess 21 with the valve in closed position. The intermediate portion consists of the expansible sleeve element which, when the valve is in closed position, extends across the flow passage and for a substantial distance onto the upper and lower wall portions 20 and 20b adjacent to it. The diameter of the sleeve element when it is not subjected to pressure is very nearly the same as the diameter of the rigid ring end portions 38 and 39. The outer surface of the sleeve is hence flush with the exposed surface of the piston element.

The expansible element assembly is slidably mounted on piston portion 29 for movement through a limited stroke, one end of which is defined by the closed bottom 32a of body 32 and the other end of which is defined by shoulder 38a on body 38 and shoulder 29a on piston portion 29. This forms upper and lower fluid chambers 42 and 44 which are connected to a source of pressurized fluid by a passage 43 through piston portion 29. A pressure liquid is contained in said chambers, some being confined between one end of element 32 and the portion 27 of the differential area piston. The rest is confined inside element 32 by the piston portion 29. A passage 31 may be provided through piston 24 with gage element 45 as a plug therefor for replenishing the pressure liquid as needed.

The operation of the valve is as follows: With the pilot valve in the position shown in FIG. 1, the side of piston portion 25 remote from the flow passage is open to exhaust, while the other side is exposed to the pressure of the fluid in the line which is admitted by way of passage 28. In consequence, the force urging the differential area piston away from the flow passage, which includes the force of the fluid acting on the bottom surface of element 32, is much greater than the force in the opposite direction. Thus there is no tendency for the valve to close. To close the valve, the control or pilot valve 46 is moved to the position shown in FIG. 2. This reverses the connections to the differential area piston so that the pressure of the line is now applied to the side of the piston portion remote from the flow passage. Since the diameter of the piston portion 25 is greater than that of the bottom element 32, the differential area piston is caused to move in the direction of the flow passage and so also the body 32. Specifically, the resultant force on the differential area piston is seen to be transmitted to the body 32 by means of the liquid confined principally in the upper and lower fluid chambers 42, 44.

When the bottom of element 32 reaches the bottom of the well 21 in the flow passage so that the element 32 can move no farther axially, the differential area piston continues to move under the influence of the line pressure, thereby pressurizing the liquid inside element 32. In consequence of the increased pressure of the liquid, the expansible element is caused to expand as shown in FIGS. 3, 5 and 6. This seals off the flow passage. In the case of a loss of pressure on the up-stream side of the line, it will be appreciated that an accumulator can be used to operate the valve.

The unique sealing action produced by the relatively longitudinally rigid yet radially expansible operating element of the invention is due to the large contact areas provided, so that the only possible leakage paths are of substantial length along the area of pressure contact provided. This can be seen from a study of the drawings, especially FIGS. 5 and 6, wherein it will be apparent that the radially expansible operating element provides a seal throughout the entire extent of the wall sections 20a as well as around the entire periphery of wall sections 20 and 20b at each side thereof. This latter peripheral sealing should be of substantial longitudinal extent, such as is shown in FIG. 3 to give the required long leakage path for optimum sealing. The use of a longitudinally rigid radially expansible element permits the use of extraordinary high sealing pressures without danger of damage to the sealing element where it is unsupported by a sealing surface, and such pressures may be of the orders of upwards of several thousand p.s.i. if desired, so that the material providing the sealing surface may operate as a fluid insofar as its flow characteristics are concerned and so provide an effective seal throughout its entire contact area. This is particularly important in dealing with high pressures of the order of upwards of several hundred p.s.i. Rubberlike materials, particularly those having high elasticity and low compressibility yet which do not tend to remain deformed under pressure are satisfactory even up to relatively high pressures. Such materials as natural and synthetic rubbers such as neoprene and hycar and silicone rubbers may be used, as may certain rubberlike plastics such as polyethylene and Teflon. For very high pressures or other specific applications, metallic sealing elements may be utilized for metal-to-metal sealing as hereinafter explained. Furthermore, by the novel utilization of an expansible element for accomplishing the pressure seal, clearances between the expansible piston and its cylinder are not critical, since they perform no sealing function. They may hence be made large for easier operation, and so are unaffected by temperature-caused dimensional changes. Nor do they need lubrication.

Referring to FIG. 8, a novel control system is shown in conjunction with the valve of the invention, such being arranged for automatic valve shut-off in case of a change in pipeline pressure above or below predetermined limits. Specifically, the valve generally designated 50 provided between upstream and downstream sections of pipeline 51 and 53 respectively is shown with its piston 52 controlling its operating element in upper or open position within cylinder 54. An accumulator 56 is provided for storing a sufficient quantity of gas for operating the valve to close it, such accumulator being supplied with gas from the up-stream side of the valve from pipeline 51 through a check valve 55. The passage of gas from accumulator 56 into the upper chamber of valve 50 above piston 52 is controlled by one of two pressure actuated control valves 57 or 59, each of which has its control input connected to the downstream side of the valve 50 in pipeline 53, preferably downstream from an orifice 58 which may be either in the main line or a by-pass line if desired. Of these control valves, valve 57 is so arranged that it will operate upon a decrease in downstream line pressure beyond a predetermined pressure to connect accumulator 56 to the upper valve chamber to close the valve. Valve 59 operates similarly but upon an increase in line pressure above a predetermined pressure.

The valve 50 having closed automatically, can be opened by the operation of valves 61, 62 and 63. Thus closing valve 61 and opening valves 62 and 63 will move the piston upwardly to reset the system.

Returning to the valve construction, the expansible piston element and its operating means may take various forms under special conditions. For example, the expansible element described above acts almost purely in radial expansion to provide a highly effective seal. With such an element, however, because of its relative stiffness, high pressures are required to operate it. Hence, liquid pressure applying means are utilized to generate pressures which may be substantially higher than those that could be realized with available gas pressures. By using even higher pressures, as is hereinafter described, the rubber outer element may be replaced by a tubular metallic element which is operated in much the same manner to provide a metal-to-metal seal especially effective in the presence of materials which might have a deleterious effect on rubber, or for other reasons. At the other end of the scale, for lower pressure operation, expansible elements made solely of a rubberlike material may be used, and such elements may be operated directly by available gas pressures, preferably from the pipeline in which the valve is installed, and possibly using auxiliary pipeline pressure operated compressors, as is also hereinafter described. It is contemplated that such valves may be especially useful in pipelines having diameters upwards of 18 inches. If high pipeline flow rates cause problems of deflection of the movable piston, an end extension can be provided therein so that the piston has its opposite ends supported by the opposite chambers at all times. In this case, the piston diameter must be larger than the flow passage so that an appropriate bore of flow passage diameter can be provided through the piston end extension. Means, such as a key and key-way should also be provided to prevent piston rotation.

Although it is preferred that fluid pressures be employed for expanding the expansible element, other means may be used under special circumstances. Thus, as is shown in FIG. 9, mechanical operating means may be substituted. More specifically, in that figure is shown a valve similar to that of FIG. 1, but wherein the bottom of piston portion 29' is provided with a conical portion 66 adapted to engage a plurality of wedge elements 67 mounted on and extending thereto as before. A spring 68 is provided between the end of said piston conical portion 66 and the bottom of the expansible valve element so that the conical piston is normally urged upward to maintain the expansible element in non-expanded condition except when required.

In FIGS. 10 and 11 is shown another preferred embodiment of the invention somewhat modified from that of FIG. 1, principally in the provision of a continuous metallic outer expansible element which may also have a novel outer surface configuration, as well as means for creating a highly pressurized body of fluid for operating such element within the valve structure itself. With such an element, of steel, for example, upwards of 10,000 p.s.i. must be applied for adequate expansion for sealing in accordance with the invention. Nevertheless, this is easily accomplished according to the invention by the use of moderate pressures of a few hundred p.s.i. for valve operation.

More specifically, the valve of FIG. 10 has a metallic housing or body 65 having a uniform cylindrical bore 66 whose wall defines a flow passage between pipelines (not shown). In communication with the flow passage is a lower cylindrical main chamber and well 71 like that of the structure of FIG. 1, with the portion of wall 70 thereof in the flow passage having a peripheral extent of about 45 degrees for optimum sealing. With the valve of FIG. 10, a moderate differential pressure, which may be supplied by the pipeline into which the valve is inserted, is needed to move the expansible element into its closed position, while a much higher differential pressure must be provided to expand said element. Thus, two differential pistons are provided, both operated from a common piston. To accomplish this, the upper portion of the main chamber has a cylindrical wall 72 of larger diameter than that of cylindrical wall 70 below, and has an end closure 73. The differential area main piston 74 is disposed in sliding engagement with cylinder 72 and carries a substantially smaller axial extension 79. To control the position of piston 74, a selected side thereof is pressurized through passages 76 and 78 through the wall of cylinder 72. Closure 73 is also bored to provide a clearance for a gage element 99 which is rigidly attached to piston 74.

Disposed concentrically about and in sliding engagement both with the end of piston extension 79 and lower cylinder 70 is the expansible element assembly which is adapted selectively to be moved in and out of the way of the flow passage. This assembly has a closed end tubular sleeve element 82 which has radial passages 83 in communication with the inner surface of the surrounding longitudinally rigid, radially expansible sleeve element. Such element, as best shown in FIG. 11, consists of an inner radially expansible metallic element 84 having an axial slot 85 therein and a surrounding outer element 86 of steel or other metallic material. It has an unbroken surface for sealing and bridges the slot 85. If desired, its outer surface may have regular thin protuberances, such as, for example, wires 87 welded thereto in a diamond pattern, as shown, to in effect provide multiple stage sealing across the effective extent of the sealing area.

A metallic ring 88, formed as part of the sleeve element 82, prevents upward movement of the composite sleeve element relatively thereto and a rigid metallic ring 89 mounted on the outer, closed end of element 82 prevents movement in the other direction. Rings 88 and 89 are disposed in sliding engagement with wall 20 and may be provided with suitable seals. The ends of the sleeve element are sealed to said rings, and between the inner element 84 and the lower portion of sleeve 82 is preferably left a small annular chamber 80, communication thereto being provided passages 83.

The expansible element assembly is slidably mounted on piston extension 79 for movement through a limited stroke. This is accomplished by the action of a pin 91 mounted on sleeve 82, which pin extends into a groove 92 in extension 79. The extension and sleeve thus provide a liquid chamber 94, a pressure liquid being contained in said chamber. It will be noted that the proportional effective area relationship between piston extension 79 and main piston 74 determines the pressure which may be achieved in chamber 94, that shown being about 1:20 so that the required high pressure of the pressure liquid may be produced by main piston pressures of but a few hundred p.s.i.

The operation of the valve of FIG. 10 is generally similar to that of FIG. 1, and hence need not be herein described except to say that the high liquid pressures produced in chamber 94 by the final movement of piston extension 79 relatively to sleeve 82 effectively expand the tubular steel outer element 84 into sealing relationship with the sealing surfaces of the housing. Although a smooth surfaced outer element could be used, wires 87 provide improved seating with multistage sealing. A somewhat modified expansible element providing metal-to-metal sealing is shown in FIG. 12, such comprising an inner completely enclosed metallic expansible tubular element 96 with a surrounding expansible metallic element 97 having a large number of perforations therein for improved sealing. It is contemplated, too, that an effective metal-to-metal seal may be provided by the use alone of an inner element such as element 96 for expansion into sealing relationship with the metallic housing. Other expansible elements may be used, for example, metal and rubber composite elements such as have been described in connection with FIG. 1 may be used when it is desired to operate the valve from particularly low pressure sources yet with high sealing pressures.

Although the invention has been described in connection with several preferred embodiments, those skilled in the art will appreciate that these embodiments are susceptible of various other modifications that are within the spirit and scope of the invention. Therefore, the invention should not be deemed to be limited to the details of what has been described herein by way of example, but rather it should be deemed to be limited only by the appended claims.

What is claimed is:

1. The combination of a fluid pressure operated valve and a control system for closing said valve in response to a pressure change above a preselected high or below a preselected low in a pipeline in which said valve is inserted, said valve having a piston and adapted to be closed by the application of a predetermined fluid pressure to a selected face of said piston portion, said control system comprising a fluid pressure accumulator continuously fed by said pipeline and connected to deliver through control valves against said selected face said predetermined fluid pressure, and two control valves connected in parallel hydraulic circuitry between said accumulator and said selected face, each of said control valves comprising a housing containing a piston, means for biasing said piston against pipeline pressure, said housing having first and second openings, said piston slidably engaging the inner surface of said housing and adapted to be moved through a range of positions relative to said housing, said piston having a transverse passage so arranged and constructed as to be in simultaneous communication with both of said openings when said piston is in at least one of said positions, and to be out of communication with at least one of said openings when said piston is in other of said positions, means connecting said first opening to said accumulator, means connecting said second opening to communicate with said preselected face, each of said control valves thereby adapted to assume an open position in which said openings communicate with each other through said transverse passage and said accumulator is in communication through said open valve with said selected face and delivers said predetermined fluid pressure against said face, each of said valves also having a closed position in which said openings are sealed from each other by said piston and said accumulator is sealed off from said selected face, each of said control valves having an additional connection to said pipeline, said additional connection adapted to deliver fluid pressure against each of said pistons to oppose said biasing means, the biasing means in one of said control valves adjusted so that said one valve remains in its closed position when the pipeline pressure is below said preselected high and moves, under the force of said fluid pressure opposing said biasing means, to its open position when the pipeline pressure rises above said preselected high, the biasing means in the other of said control valves adjusted so that the other valve remains in its closed position when the pipeline pressure is above said preselected low and moves, under the force of said biasing means, to its open position when the pipeline pressure falls below said preselected low.

2. The combination of claim 1 wherein said accumulator is additionally connected through a manually controllable valve to communicate with the face of said piston portion opposite said selected face, and means is provided to relieve pressure from said selected face, the opening of said manually controllable valve after the closing of said fluid pressure operated valve and the relief of pressure from said selected face enabling fluid pressure from said accumulator to reopen said fluid pressure operated valve.

(References on following page)

References Cited by the Examiner

UNITED STATES PATENTS

| | | | |
|---|---|---|---|
| 712,485 | 11/1902 | Bickford | 251—175 |
| 2,425,483 | 8/1947 | Mueller | 251—187 |
| 2,426,212 | 8/1947 | Hedene | 137—488 XR |
| 2,448,706 | 9/1948 | Edwards | 251—175 |
| 2,582,877 | 1/1952 | Mekler | 251—175 |
| 2,664,262 | 12/1953 | Mueller | 251—187 |
| 2,707,483 | 5/1955 | Shafer | 137—456 |
| 2,873,761 | 2/1959 | Tailleferre | 251—175 |
| 2,886,281 | 5/1959 | Canalizo | 251—57 |
| 3,018,791 | 1/1962 | Knox | 137—458 |
| 3,042,057 | 7/1962 | Zorgdrager | 137—458 XR |
| 3,043,331 | 7/1962 | Peters | 137—458 |

FOREIGN PATENTS

| | | |
|---|---|---|
| 543,171 | 1956 | Belgium. |
| 711,187 | 1941 | Germany. |

M. CARY NELSON, *Primary Examiner.*

MILTON KAUFMAN, *Examiner.*